United States Patent
Hofbauer et al.

(10) Patent No.: US 11,052,947 B2
(45) Date of Patent: Jul. 6, 2021

(54) STRUCTURAL COMPONENT

(71) Applicant: Bayerische Motoren Werke Aktiengesellschaft, Munich (DE)

(72) Inventors: Daniel Hofbauer, Triftern (DE); Thomas Wolff, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/164,205

(22) Filed: Oct. 18, 2018

(65) Prior Publication Data

US 2019/0047626 A1 Feb. 14, 2019

Related U.S. Application Data

(63) Continuation of application No. PCT/EP2017/058524, filed on Apr. 10, 2017.

(30) Foreign Application Priority Data

Apr. 20, 2016 (DE) ...................... 10 2016 206 642.0

(51) Int. Cl.
| | |
|---|---|
| *B62D 21/15* | (2006.01) |
| *B60R 19/18* | (2006.01) |
| *B62D 29/00* | (2006.01) |
| *B62D 29/04* | (2006.01) |
| *B60R 19/22* | (2006.01) |

(Continued)

(52) U.S. Cl.
CPC .............. *B62D 21/15* (2013.01); *B60R 19/18* (2013.01); *B62D 29/005* (2013.01); *B62D 29/04* (2013.01); *B60R 19/22* (2013.01); *B60R 2019/186* (2013.01); *B60R 2019/188* (2013.01); *B60R 2019/1853* (2013.01);

(Continued)

(58) Field of Classification Search
CPC ...... B62D 21/15; B62D 29/04; B62D 29/005; B62D 25/04; B62D 25/025; B60R 19/18; B60R 19/22; B60R 2019/1853; B60R 2019/186; B60R 2019/1873
USPC ........ 52/167.1, 167.7, 573.1, 838, 839, 841; 296/187.06, 187.12, 209
See application file for complete search history.

(56) References Cited

U.S. PATENT DOCUMENTS

| | | | | |
|---|---|---|---|---|
| 3,078,971 | A * | 2/1963 | Wallerstein, Jr. ......... | E04B 1/98 52/403.1 |
| 3,088,561 | A * | 5/1963 | Ruzicka .................... | E04C 3/29 52/841 |

(Continued)

FOREIGN PATENT DOCUMENTS

| | | |
|---|---|---|
| CN | 101032941 A | 9/2007 |
| DE | 296 01 143 U1 | 5/1996 |

(Continued)

OTHER PUBLICATIONS

PCT/EP2017/058524, International Search Report dated Jun. 19, 2017 (Three (3) pages).

(Continued)

*Primary Examiner* — Brian E Glessner
*Assistant Examiner* — Adam G Barlow
(74) *Attorney, Agent, or Firm* — Crowell & Moring LLP

(57) ABSTRACT

A structural component, in particular for a vehicle, includes a beam and at least one energy absorption device which is disposed on a portion of the outer surface of the beam. The beam is profiled and has at least one inner chamber.

13 Claims, 1 Drawing Sheet

(51) Int. Cl.
  *B62D 25/02* (2006.01)
  *B62D 25/04* (2006.01)
  *B62D 25/06* (2006.01)

(52) U.S. Cl.
  CPC .... *B60R 2019/1873* (2013.01); *B62D 25/025* (2013.01); *B62D 25/04* (2013.01); *B62D 25/06* (2013.01)

(56) References Cited

U.S. PATENT DOCUMENTS

| | | | | |
|---|---|---|---|---|
| 4,566,231 A * | 1/1986 | Konsevich | ............... | E04B 1/98 181/208 |
| 4,899,323 A * | 2/1990 | Fukahori | ............... | E04B 1/36 248/560 |
| 4,923,902 A * | 5/1990 | Wycech | ............... | B62D 21/09 206/304 |
| 4,995,545 A * | 2/1991 | Wycech | ............... | B62D 21/09 228/119 |
| 5,194,199 A * | 3/1993 | Thum | ............... | B29C 44/1242 264/275 |
| 5,412,921 A * | 5/1995 | Tripp | ............... | E04C 3/28 428/903.3 |
| 5,540,016 A * | 7/1996 | Clausen | ............... | B60J 5/0444 52/98 |
| 5,958,556 A * | 9/1999 | McCutcheon | ....... | H05K 1/0271 428/172 |
| 6,009,682 A * | 1/2000 | Lehman | ............... | E04F 11/1836 256/1 |
| 6,054,197 A * | 4/2000 | Rastegar | ............... | E04C 3/29 428/188 |
| 6,443,511 B2 * | 9/2002 | Braun | ............... | B60R 19/18 293/102 |
| 6,468,613 B1 * | 10/2002 | Kitano | ............... | B32B 15/08 428/35.8 |
| 7,287,809 B2 * | 10/2007 | Andre | ............... | B60R 21/34 296/187.04 |
| 9,782,950 B2 * | 10/2017 | Richardson | ............ | B32B 15/08 |
| 2002/0002801 A1 * | 1/2002 | Fischer | ............... | E01D 19/00 52/167.1 |
| 2004/0036302 A1 * | 2/2004 | Shuler | ............... | B60R 19/18 293/120 |
| 2005/0077752 A1 * | 4/2005 | Albers | ............... | B60J 5/0447 296/146.6 |
| 2009/0085379 A1 * | 4/2009 | Takahashi | ............... | B62D 25/04 296/193.06 |
| 2013/0221691 A1 * | 8/2013 | Nagwanshi | ............ | B60R 19/18 293/132 |
| 2015/0069773 A1 | 3/2015 | Mukainakano et al. | | |
| 2016/0159300 A1 * | 6/2016 | Matecki | ............... | B60R 19/18 293/120 |
| 2016/0200370 A1 * | 7/2016 | Muhammad | ......... | B62D 29/001 293/120 |
| 2016/0311467 A1 * | 10/2016 | Johnston | ............... | B32B 27/38 |
| 2018/0328435 A1 * | 11/2018 | Tyan | ............... | F16F 7/121 |

FOREIGN PATENT DOCUMENTS

| | | |
|---|---|---|
| DE | 10 2006 058 604 A1 | 6/2008 |
| DE | 10 2007 014 464 A1 | 10/2008 |
| DE | 10 2008 057 884 A1 | 5/2010 |
| DE | 10 2010 030 535 A1 | 11/2011 |
| DE | 10 2014 207 948 A1 | 10/2015 |
| EP | 2 404 788 A1 | 1/2012 |
| EP | 2404788 * 2/2012 | ............... B60R 9/18 |
| JP | 2000-79856 A | 3/2000 |
| WO | WO 02/087925 A1 | 11/2002 |
| WO | WO 03/037668 A1 | 5/2003 |
| WO | WO 2014/000831 A1 | 1/2014 |

OTHER PUBLICATIONS

German Search Report issued in German counterpart application No. 10 2016 206 642.0 dated Jan. 2, 2017, with Statement of Relevancy (Eight (8) pages).

English-language Chinese Office Action issues in application No. 201780005895.X dated Apr. 2, 2020 (Eleven (11) pages).

* cited by examiner

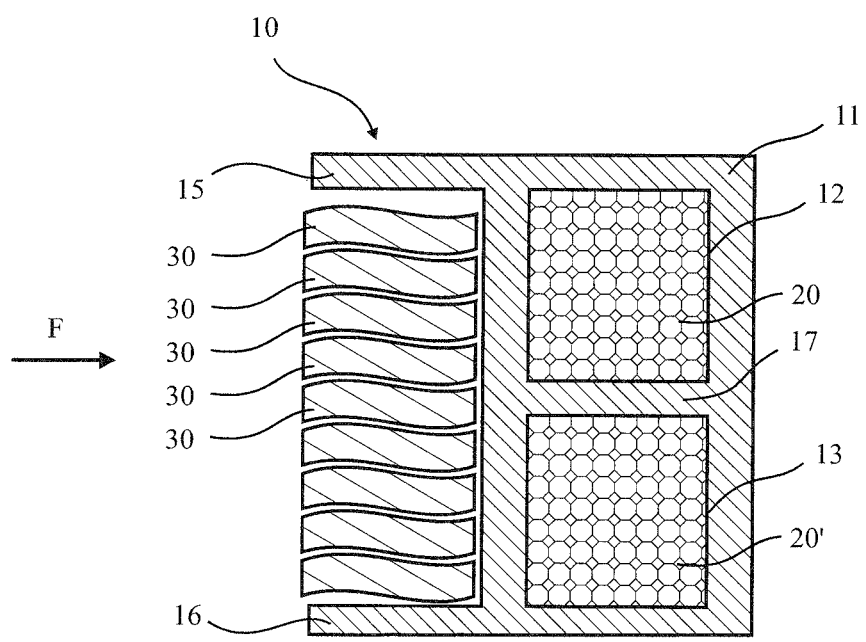

STRUCTURAL COMPONENT

CROSS REFERENCE TO RELATED APPLICATIONS

This application is a continuation of PCT International Application No. PCT/EP2017/058524, filed Apr. 10, 2017, which claims priority under 35 U.S.C. § 119 from German Patent Application No. 10 2016 206 642.0, filed Apr. 20, 2016, the entire disclosures of which are herein expressly incorporated by reference.

BACKGROUND AND SUMMARY OF THE INVENTION

The present invention relates to a structural component, in particular for a vehicle, having a beam and at least one energy absorption device which is arranged on a portion of the outer surface of the beam.

It is known from DE 10 2014 207 948 A1 to apply a deformation component consisting of a thermoplastic material to a structural component consisting of a thermoplastic semi-finished product. Such a structure is used for example in the region of the sill. In the event of a lateral crash load case, the thermoplastic deformation honeycomb absorbs the energy, thereby destroying a large part of the energy and introducing the remainder into the flexural beam.

Proceeding from this prior art, the object of the present invention is to specify a structural component which is distinguished by a particularly high energy absorption. It is a particular object of the invention to specify a structural component in which the specific energy absorption is as high as possible with respect to the installation space requirement.

To achieve this object, the invention proposes a structural component, in particular for a vehicle, having a beam and at least one energy absorption device which is arranged on a portion of the outer surface of the beam. Furthermore, the beam can be profiled and have at least one inner chamber. This offers the advantage that relatively thin-walled beams can be used which are thereby lighter than a thicker-walled or unprofiled beam if the same mechanical properties, in particular with respect to strength in relation to thrust forces, are to be achieved.

Furthermore, the beam can be formed from fiber-reinforced plastic, in particular from glass- and/or carbon-fiber-reinforced plastic. The use of such materials offers a particularly high strength in combination with comparatively low component weights.

Use is preferably made of an energy absorption device, which degrades or reduces the energy or force acting thereon by mechanical disintegration. Mechanical disintegration can be understood here as bursting, splintering, crumbling or some other change in shape. Such an energy absorption device, also known as a crushing element, allows a considerably increased energy absorption over as short a deformation path as possible. This advantage is further reinforced precisely by the combination with a profiled beam. The beam ensures a required component stiffness and supports the energy absorption device such that, in the event of thrust forces acting thereon, the absorption device can crumble in a targeted and secure manner.

According to a first embodiment of the invention, the energy absorption device can be surrounded at least in certain portions by projecting regions or projecting walls. This offers the advantage that slipping of the energy absorption device with respect to the beam is prevented if the thrust force acting thereon also has a force component in a direction different from the main direction. The projecting region or the projecting wall thereby offers a counterforce to the additional force component.

In a further embodiment, the beam can have projecting regions, in particular projecting walls, which form a recess into which the energy absorption device is inserted. As a result, force components of the thrust force acting in the event of a crash are advantageously degraded in any desired direction by being absorbed by a wall. Moreover, a fully enclosing wall can apply a sufficient static friction such that the energy absorption device is sufficiently fixed and does not have to be fastened by additional measures such as screwing, adhesive bonding or the like.

The energy absorption device can be formed from glass- and/or carbon-fiber-reinforced plastic. The use of these materials means that the energy absorption device is likewise formed as a fiber-reinforced plastic and can absorb particularly high forces in the event of a crash.

The reinforcing fibers arranged in the energy absorption device can have their longitudinal side oriented substantially perpendicular to the surface of the beam. As a result, the reinforcing fibers are oriented substantially parallel to a loading direction in the event of a crash and can absorb still higher forces or degrade higher energies.

Moreover, the beam and the energy absorption device can be produced by the pultrusion method. The pultrusion method is one of the most economic methods for producing fiber-reinforced plastics in large numbers and is therefore particularly suitable for use in body construction.

Furthermore, a filling element can be formed in the inner chamber. If a plurality of chambers are provided, in each case one or more filling elements can be arranged in one, in a plurality of, or in all chambers. The filling element or the filling elements can be formed as foam cores. Suitable materials for this foam core are foaming materials, such as, for example, polyurethane and the like. The filling element can also be formed as a honeycomb core, for example a paper or thermoplastic honeycomb. Moreover, a solid material can also be used for filling. Alternatively, the filling element can also be formed of solid material. Here, the filling element can completely or at least partially fill the inner chamber, or the filling elements can completely or at least partially fill the inner chambers. The filling element offers the advantage that, under a thrust loading of the beam, the thrust forces are transferred from one side of the beam on which they directly act to an opposite side of the beam. As a result, the thrust forces can be better absorbed and the energy absorption device can be better supported by the beam.

Furthermore, at least one attachment element can be arranged in the beam and intended for connecting the beam to further units. Alternatively or additionally, at least one attachment element can be arranged in the filling element and intended for connecting the beam to further units. The attachment elements can be designed as sleeves with or without an internal thread or as pins with or without an external thread. Further units are in particular other structural components or else high-voltage accumulators, motor mounts, etc.

The reinforcing fibers can be organic or inorganic reinforcing fibers. The reinforcing fibers can be carbon fibers, for example. These form, together with the plastic matrix, a carbon-fiber-reinforced plastic, also termed CFRP. The associated FRP component is then a CFRP component. The reinforcing fibers can also be glass fibers, for example. These form, together with the plastic matrix, a glass-fiberreinforced plastic, also termed GFRP. The associated FRP component is then a GFRP component. However, the invention is not limited thereto, and the reinforcing fibers can, for example, also be aramid fibers, polyester fibers, nylon fibers, polyethylene fibers, PMMA fibers, basalt fibers, boron fibers, ceramic fibers, silica fibers, steel fibers and/or natural fibers.

The fibers can be provided as a laid scrim, woven fabric, braided fabric or as a random fiber in a fiber layer of the semi-finished product. Moreover, the fiber semi-finished product can also comprise a plurality of fiber layers which can also consist of a combination of the aforementioned layer types.

The material of the plastic matrix may in particular have one or more thermoplastics and/or thermosets. For use as material of the plastic matrix, polyamides, for example PA-6 or PA-66, and polyphthalamides are particularly suitable. Fiber-reinforced plastics having a thermoplastic matrix have the advantage that they can be subsequently formed or welded. The following are suitable for example as thermoplastics: polyether ether ketone (PEEK), polyphenylene sulfide (PPS), polysulfone (PSU), polyetherimide (PEI), polyamides, polyphthalamides and/or polytetrafluoroethene (PTFE). Fiber-reinforced plastics having a thermoset matrix can no longer be formed after curing or crosslinking the matrix. They advantageously have a high temperature use range. This applies in particular to hot-curing systems which are cured under high temperatures. Fiber-reinforced plastics having a thermoset matrix usually have the highest strengths. The following resins can be used for example as thermosets or matrix: epoxy resin (EP), unsaturated polyester resin (UP), vinyl ester resin (VE), phenol formaldehyde resin (PF), diallyl phthalate resin (DAP), methacrylate resin (MMA), polyurethane (PUR), amino resins, melamine resin (MF/MP) and/or urea resin (UF).

Suitable materials for the foam core are in particular polyurethane (PUR), polystyrene (PS), polyvinyl chloride (PVC) or polymethacrylimides.

Within the context of this invention, structural components are body components which are connected to one another for example during the production of a vehicle body. Such components are in particular side sills, roof side frames, roof bows, A pillars, B pillars, C pillars and the like. Moreover, however, bumper beams can also be understood to be structural components within the context of this invention since the invention can also be applied thereto.

The invention will be explained in more detail below with reference to the description of the FIGURE. The FIGURE, the description and the claims contain features which a person skilled in the art would also consider in another combination in order to adapt the invention to other requirements.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows a schematic sectional view through a structural component.

DETAILED DESCRIPTION OF THE DRAWING

The FIGURE shows a section perpendicular to the longitudinal direction of a structural component 10. The structural component 10 comprises a beam 11 which is profiled and has two inner chambers 12 and 13. In further embodiments, which are not illustrated, a beam 11 can also have only one individual chamber or more than two chambers. In the FIGURE, the two chambers 12 and 13 are separated from one another by a web 17. In further embodiments, which are not illustrated, a plurality of webs can also be provided. In the chambers 12, 13 there are provided foam cores 20, 20' which here, by way of example, completely fill the chambers 12, 13. In the event of a crash, the web 17 and the foam cores 20, 20' transfer the force, which is introduced into the vertically extending wall (the left one in the FIGURE) of the beam 11, to the vertically extending wall (the right one in the FIGURE) of the beam 11. Instead of the foam core, use can also be made of an alternative filling element, such as, for example, honeycomb cores of thermoplastic, paper, etc.

As can further be seen from the FIGURE, the beam 11 has walls 15 and 16 which project on the left-hand side. These walls 15, 16 accommodate between them one or more energy absorption devices or crush elements 30. The crush elements 30 are thus arranged in a region of the surface of the beam 11. The region of the surface can be laterally surrounded partially or else completely by the walls 15, 16. In further embodiments, the walls 15, 16 can be dispensed with, with the result that the crush elements are not supported laterally.

In the event of a lateral crash—here represented by the force F and the associated arrow—a force or energy is exerted on these crush elements 30. The beam 11 counteracts the thrust force F by a counterforce, with the result that the crush elements 11 burst and energy is degraded in the process.

In the illustration in the FIGURE, the thrust force F acts perpendicularly on the beam 11. However, in other cases, the force F can also act at an oblique angle on the beam 11. In these cases, only one force component then acts perpendicularly on the beam 11. The force components which do not act perpendicularly on the beam are taken up by the walls 15, 16. In other words, the walls 15, 16 build up counterforces to support the non-perpendicularly acting force components.

The beam 11 forms the basic structure of a sill, for example. Here, it is formed from endless fiber-reinforced carbon fibers. Here, about 70% of the endless fibers point in the longitudinal direction of the beam 11. About 30% of the endless fibers are arranged at an angle of +45° and/or −45°. The fibers are then surrounded by a resin. The foam cores are produced subsequently, by foaming out the chambers in the beam 11. The crush elements are likewise joined subsequently to the existing beam 11.

Moreover, the beam 11 can also have attachment elements, in particular inserts for attaching the high-voltage accumulator. The inserts can be introduced subsequently into the beam or early as with introduction of the foam. The strength of the structural component 10 is sufficient to support the energy accumulator of an electrically operated vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A structural component, comprising:
   a beam; and an energy absorption device;

wherein the beam is profiled and has a first inner chamber that is bounded by a first vertically extending wall of the beam and a second vertically extending wall of the beam, wherein the energy absorption device comprises a plurality of crush elements, wherein the plurality of crush elements are disposed in a region of an outer surface of the beam, wherein the region of the outer surface of the beam is laterally surrounded on a first side and a second side by respective projecting walls of the beam, and wherein the respective projecting walls of the beam and the beam are monolithically formed in one piece;

wherein the structural component is a body component of a vehicle.

2. The structural component as claimed in claim 1, wherein the beam is formed from fiber-reinforced plastic.

3. The structural component as claimed in claim 2, wherein the fiber-reinforced plastic is glass- and/or carbon-fiber-reinforced plastic.

4. The structural component as claimed in claim 1, wherein the energy absorption device degrades an energy/force acting on the energy absorption device by mechanical disintegration.

5. The structural component as claimed in claim 4, wherein the mechanical disintegration is crumbling.

6. The structural component as claimed in claim 1, wherein the energy absorption device is formed from glass- and/or carbon-fiber-reinforced plastic.

7. The structural component as claimed in claim 6, wherein reinforcing fibers disposed in the energy absorption device have a respective longitudinal direction oriented substantially perpendicular to the outer surface of the beam.

8. The structural component as claimed in claim 1, wherein the beam is a pultruded profile.

9. The structural component as claimed in claim 1 further comprising a first filling element, wherein the first filling element is disposed in the first inner chamber.

10. The structural component as claimed in claim 9, wherein the first filling element is a foam core or a honeycomb core or a core of solid material.

11. The structural component as claimed in claim 1 further comprising a second inner chamber that is bounded by the first vertically extending wall of the beam and the second vertically extending wall of the beam, wherein a web of the beam that extends between the first vertically extending wall of the beam and the second vertically extending wall of the beam separates the first inner chamber from the second inner chamber.

12. The structural component as claimed in claim 11 further comprising a second filling element, wherein the second filling element is disposed in the second inner chamber.

13. The structural component as claimed in claim 12, wherein the second filling element is a foam core or a honeycomb core or a core of solid material.

* * * * *